United States Patent [19]

Miyakawa et al.

[11] Patent Number: 4,757,659
[45] Date of Patent: Jul. 19, 1988

[54] FRONT GLASS MOULDINGS

[75] Inventors: Naohisa Miyakawa, Nagareyama; Siyosuke Seto, Daifu, both of Japan

[73] Assignee: Tokiwa Chemical Industries Co., Ltd., Chiba, Japan

[21] Appl. No.: 939,435

[22] Filed: Dec. 4, 1986

[51] Int. Cl.⁴ ............................................. E04B 1/62
[52] U.S. Cl. ...................................... 52/400; 296/93; 296/208
[58] Field of Search .................... 52/397, 400, 208; 396/93, 208, 213, 154

[56] References Cited

U.S. PATENT DOCUMENTS 3,583,757  6/1971  Wilfert ........................... 296/154 X
4,523,783  6/1985  Yamada ........................... 52/208 X

FOREIGN PATENT DOCUMENTS 59-12714  1/1984  Japan .
60-1002   1/1985  Japan .

*Primary Examiner*—Carl D. Friedman
*Attorney, Agent, or Firm*—Wenderoth, Lind & Ponack

[57] ABSTRACT

A front glass moulding of an integrally formed synthetic resin body has a top and a leg extending downwardly from the top. The body has a central portion and two side portions connected at one end to the respectively adjacent end of the central portion. The central portion includes a front glass pane receiving groove, and the side portions each include a rainwater guide and a front glass pane receiving groove for supporting a front glass pane in cooperation with the glass pane receiving groove in said central portion. A glass pane support board helps retain the glass in cooperation with the leg of the moulding.

2 Claims, 3 Drawing Sheets

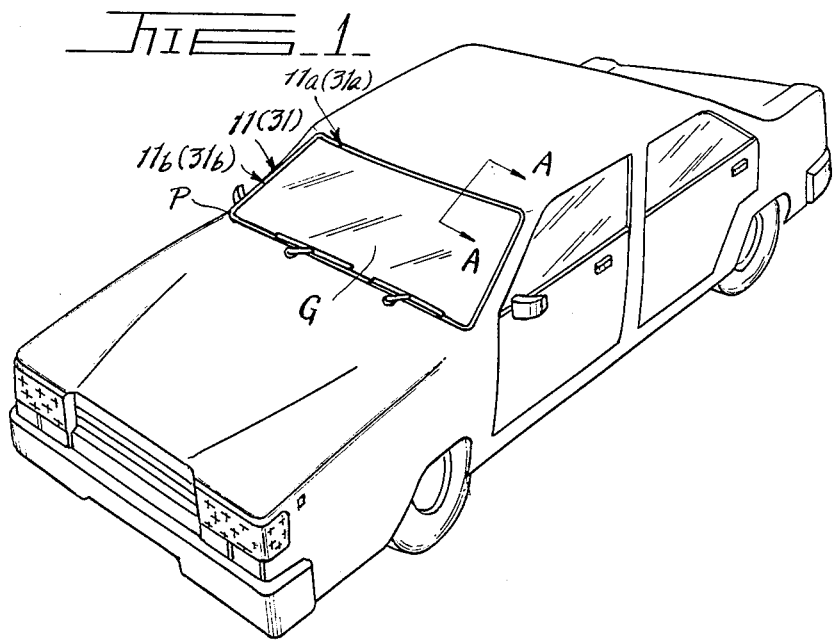
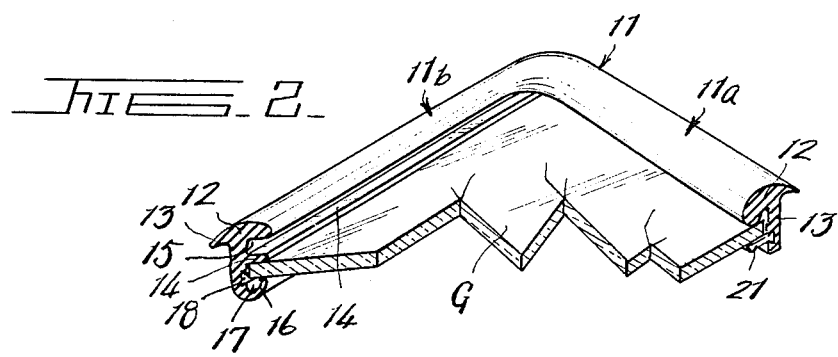
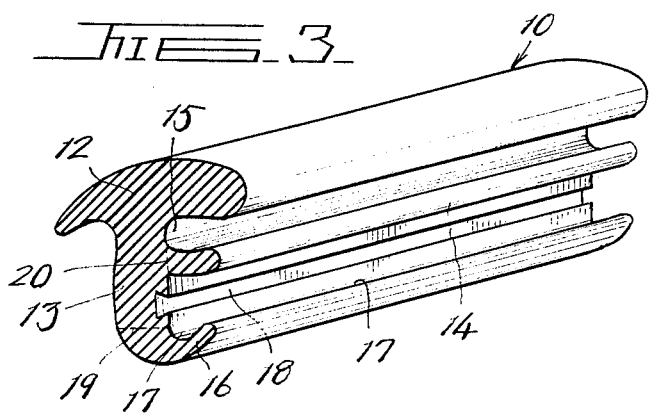

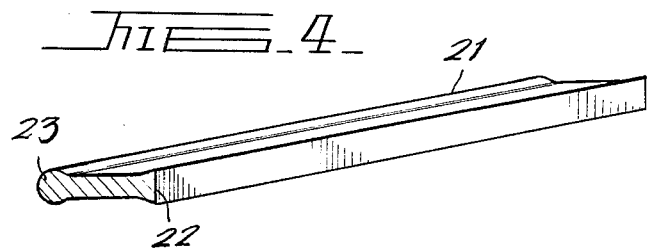
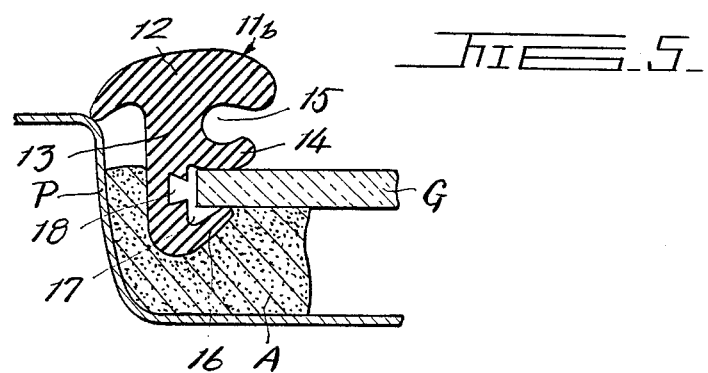
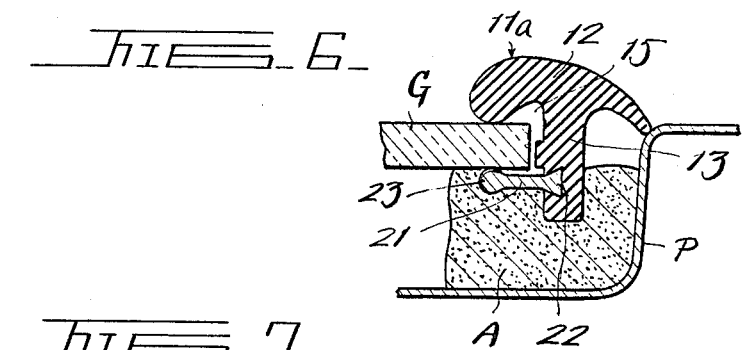
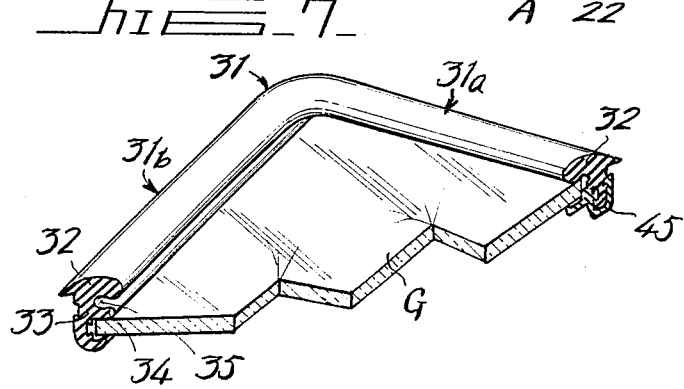

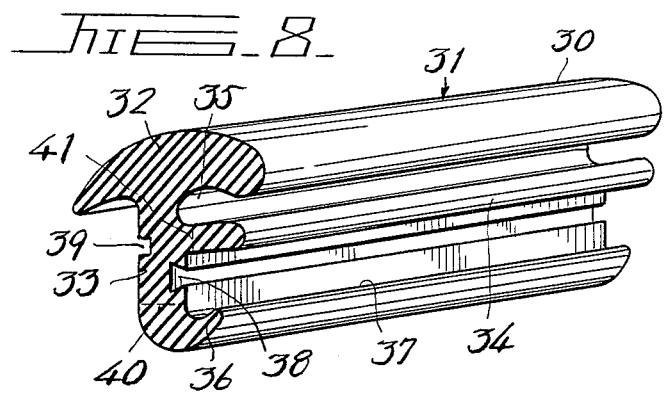
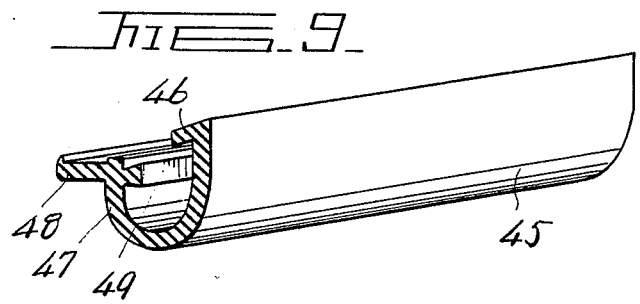
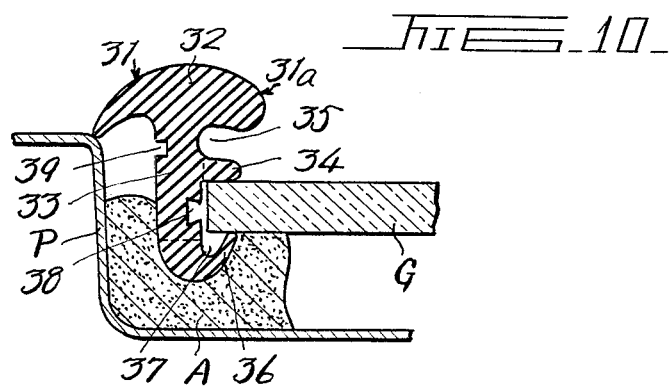
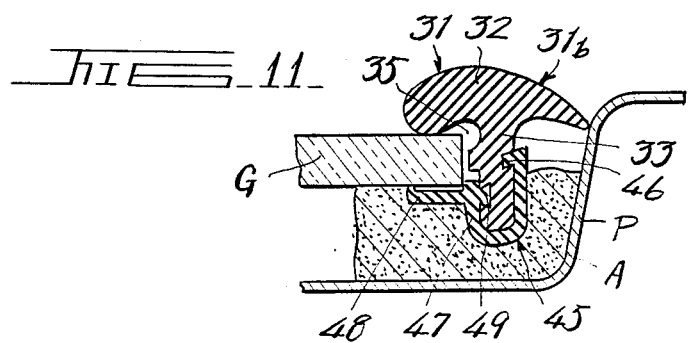

4,757,659

FRONT GLASS MOULDINGS

BACKGROUND OF THE INVENTION

This invention relates to front glass mouldings adapted to be employed between the body panel and front glass panes in the front portions of various vehicles and more particularly to front glass mouldings each comprising a single moulded body which integrally has a central portion including a front glass pane receiving groove and two side portions each including a rainwater guide and a front glass pane receiving groove for supporting a front glass pane in cooperation with the glass panel receiving groove in the central portion.

A variety of front glass mouldings for vehicles have been hitherto proposed and practically employed. In a vehicle of the type in which the vehicle panel and front glass panel are connected together by means of adhesive, the front glass moulding is mounted in the clearance in the boundary between the edge of the opening in the vehicular body panel and the front glass pane to fill the clearance and, at the same time, present a pleasing external appearance. In one of the recently developed front glass mouldings, the side portions of the front glass moulding each have a front glass pane receiving groove in a lower portion and a rainwater guide in an upper portion in the inner surface of the associated side portion so that rainwater striking against the front glass pane and scattering about is prevented from invading into the cab of the vehicle. However, as the front glass moulding having the upper and lower grooves as the rainwater guide and front glass panel receiving groove, respectively, cannot be used as the central moulding portion, a separately formed front glass moulding having only the front glass pane receiving groove has to be employed in conjunction with the front glass moulding having both the rainwater guide and front glass pane receiving groove, and the two types of front glass mouldings are connected together by means of corner joints. Thus, the conventional front glass moulding comprises three types of components, that is, the central moulding portion, the side moulding portions, and the corner joints connecting the central and side moulding portions. Thus, the provision of the corner joints at the joints of the front glass moulding portions presents a disfigured external appearance and the corner joints are vulnerable to damage. Furthermore, as the conventional front glass moulding employs the three types of components, the front glass moulding is expensive.

In order to eliminate the drawbacks inherent in the conventional front glass moulding referred to hereinabove, it one has longed for a front glass moulding which can be produced from a single moulded body to provide a central portion and two side portions integral with the central portion for supporting a first glass pane, that eliminates the conventional corner joints for connecting the central and side portions, and that can be easily formed and is rigid in construction.

SUMMARY OF THE INVENTION

Therefore, the present invention has as its object to provide a front glass moulding which can effectively eliminate the drawbacks inherent in the conventional front glass mouldings.

In order to attain the object, the present invention provides a front glass moulding which comprises an integral body including a central portion, and two side portions having a cross-sectional configuration different from that of the central portion for supporting a front glass pane, that presents a pleasing appearance, and that eliminates the conventional corner joints and has a rigid construction.

In one embodiment of the invention, the front glass moulding comprises an integrally formed synthetic resin body having a top and a leg extending downwardly from the top, and consisting of a central portion and two side portions integrally connected at one end to the respectively adjacent end of the central portion. The central portion includes a glass pane support board extending outwardly from the surface of said leg both below said top in substantially parallel and spaced relationship to the latter to define a front glass pane receiving groove therebetween. The side portions each include an upper arm extending outwardly from the surface of said leg below said top in substantially parallel and spaced relationship to the latter to define a rainwater guide therebetween, and a lower arm extending outwardly from the surface of said leg below said upper arm in spaced relationship to the latter to define a front glass pane receiving groove therebetween. The front glass pane receiving grooves in the central and side portions cooperate with each other in supporting a front glass pane.

In another embodiment of the invention, the front glass moulding comprises an integrally formed synthetic resin body having a top and a leg extending downwardly from the top, and consisting of a central portion and two side portions integrally connected at one end of the respectively adjacent end of the central portion. The central portion includes a front glass pane support board fitted about the lower end portion of said leg and having an extension extending outwardly from the surface of said leg both below said top and in substantially parallel and spaced relationship to the top to define a glass receiving groove therebetween. The side portions each include an upper arm extending outwardly from the surface of said leg both below said top and in substantially parallel and spaced relationship to the latter to define a rainwater guide therebetween, and a lower arm extending outwardly from the surface of said leg below said upper arm in spaced relationship to the latter to define a front glass pane receiving groove therebetween. The glass pane receiving grooves in the central and side portions cooperate with each other in supporting a front glass pane.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 1 is a perspective view of an automobile in which the front glass moulding according to the present invention is incorporated;

FIG. 2 is a fragmentary perspective view on an enlarged scale of a first embodiment of the front glass moulding according to the present invention with a portion thereof cut away to show the connection between the moulding and a front glass pane;

FIG. 3 is a fragmentary perspective view on a further enlarged scale of the preform for the first embodiment of the front glass moulding shown in FIG. 2;

FIG. 4 is a fragmentary perspective view of the front glass panel support board for use with the first embodiment of the front glass moulding with a portion thereof cut away;

FIG. 5 is a cross-sectional view of one of the side portions of the first embodiment of the front glass moulding;

FIG. 6 is a sectional view taken along substantially the line A—A of FIG. 1;

FIG. 7 is a fragmentary perspective view of a second embodiment of the front glass moulding according to the present invention with a portion thereof cut away;

FIG. 8 is a fragmentary perspective view on an enlarged scale of the preform for the second embodiment of the front glass moulding of FIG. 7 with a portion thereof cut away;

FIG. 9 is a fragmentary perspective view of the the front glass pane support board for use with the moulding of FIG. 7;

FIG. 10 is a cross-sectional view of one of the side portions of the front glass moulding of FIG. 7; and FIG. 11 is a cross-sectional view of the central portion of the front glass moulding of FIG. 7.

PREFERRED EMBODIMENTS OF THE INVENTION

The present invention will be now described referring to the accompanying drawings and more particularly, to FIGS. 2 to 6 in which the first embodiment of the front glass moulding of the present invention is shown. The front glass moulding is adapted to be installed between the body panel and front glass pane in a vehicle such as an automobile. The preform for the first embodiment of the front glass moulding is generally shown by reference numeral 10 in FIG. 3 and comprises an integrally formed synthetic resin body 11 which includes a top 12, a leg 13 extending downwardly from the top 12, a first or upper arm 14 extending inwardly from the inner surface of the leg 13 below and in substantially parallel and spaced relationship to the top 12 to define a first groove 15 therebetween and a second or lower arm 16 extending inwardly from the inner surface of the leg 13 below and in substantially parallel and spaced relationship to the first arm 14 to define a second groove 17 therebetween. Reference numeral 19 denotes a first horizontal cutting line and reference numeral 20 denotes a second vertical cutting line.

The preform 10 for the front glass moulding consists of a central portion and two side portions connected at one end to the respectively adjacent end of the central portion.

In the production of the first embodiment of the front glass moulding from the preform, the preform section forming the moulding central portion is cut along the first and second lines 19 and 20 to remove the first and second arms 14 and 16 and a portion of the second groove 17 to provide the central portion 11a of the front glass moulding and each of the preform sections forming the two moulding side portions is cut along a line (not shown) extending upwardly and slantingly from the undersurface at the free end of the section to the other end connected to the adjacent end of the the moulding central portion of the preform, thus reducing the thickness of the preform section to the extent that the section has the same thickness as the moulding central portion forming section to thereby provide the side portion 11b of the front glass moulding. The inner surface of the leg 13 is formed with a dovetailed recess 18 in a position between the first and second arms 14 and 16 for the purpose to be described hereinafter. Reference numeral 21 denotes a synthetic resin glass panel support board having a dovetailed end 22 and a bulged end 23. In order to complete the first embodiment of the front glass moulding, the glass support board 21 is inserted into the dovetailed recess 18 at the dovetailed end 22. In the complete front glass moulding, the groove 15 defined by the top 12 and first arm 14 in each of the side portions 11b serves as a rainwater guide. A front glass pane G is then slid along the grooves 17 in the side portions 11b until the leading edge of the glass pane G is received in the first groove 15 defined by the top 12 and the glass pane support board 21 in the central portion 11a.

The front glass moulding 10 having the front glass pane G supported therein is then placed into the panel P of the vehicular body with the outer side edge of the top 12 engaging the panel P leaving a clearance between the panel P and the leg 13. The clearance is partially filled with adhesive A to hold the front glass moulding 10 and front glass pane G in position in the vehicular body.

As mentioned hereinabove, according to the present invention, each of the opposite side edges of the front glass panel G is received in the groove 17 defined by the first and second arms 14, 16 in the associated side portion 11b of the moulding whereas the groove 15 defined by the top 12 and first arm 14 serves as the rainwater guide in the side portion 11b as more clearly shown in FIG. 5. In the central portion 11a of the moulding where the first arm 14, the lower arm 16 and a portion of the second groove 18 have been removed therefrom, the leading edge of the front glass pane G is received in the first groove 15 defined between the top 12 and glass pane support board 21. Thus, it will be understood that the central portion 11a is not provided with the rainwater guide as provided in the side portion 11b.

With the above-mentioned construction and arrangement of the components of the first embodiment of the front glass moulding, according to the first embodiment of the front glass moulding of the present invention, the central and side portions 11a, 11b can be integrally formed from the single preform to positively hold the front glass pane. In addition, as the front glass moulding of the invention does not require corner joints between the central and side portions 11a, 11b, the moulding can be economically produced. Furthermore, the unitary construction gives a pleasing appearance and sufficient rigidity to the front glass moulding. And the provision of the dovetailed recess 18 in the leg between the upper and lower arms makes it easy to engage the glass pane board with the leg. The cutting of the first arm at its base end off the leg provides the central portion without the rainwater guide; and the cutting of the lower arm and a portion of the second groove off the leg in the central portion reduces the thickness of the leg to thereby provide the front glass moulding having the reduced thickness.

Now, turning to FIGS. 7 to 11 which show the second embodiment of the front glass moulding of the present invention, the second embodiment of the front glass moulding is produced from the preform which is generally shown by reference numeral 30 in FIG. 8 and the preform comprises an integrally formed synthetic resin body 31 which includes a top 32, a leg 33 extending downwardly from the top 32, a first arm 34 extending outwardly from the surface of the leg 33 both below the top 32 and in substantially parallel and spaced relationship to the latter to define a first groove 35 therebetween. A second arm 36 extends outwardly from the surface of the leg 33 both below the first arm 34 in and spaced relationship thereto to define a second groove 37 therebetween. A dovetailed recess 38 is formed in the inner surface of the leg 33 between the first and second arms 34, 36 and a recess 39 is formed in the outer surface of the leg 33 in a plane which is substantially the same as the first arm 34. As in the preform for the first embodiment of the front glass moulding, the preform for the second embodiment of the front glass moulding consists of a moulding central forming section and two moulding side portion forming sections integrally connected at one end to the respective adjacent end of the moulding central portion forming section. Reference numeral 40 denotes a horizontal cutting line provided on the leg 33 between the dovetailed recess 38 and lower arm 36 and reference numeral 41 denotes a vertical cutting line provided at the base end of the first arm 34. Reference numeral 45 denotes a synthetic resin glass pane support board which has a substantially U-shaped cross-section and includes a first longer leg 46 and a second shorter leg 47 with a horizontal extension 48 extending horizontally and across at the top of the second leg 47 and having a dovetailed end 49 for being received in the dovetailed recess 38. The upper end of the first longer leg 46 of the glass pane support board 45 is bent inwardly horizontally for being received in the recess 39 in the central portion leg 13.

In the production of the second embodiment of the front glass moulding of the invention from the preform 30, the preform section forming the central portion is cut along the horizontal cutting line 40 to remove the second arm 36 and a portion of the second groove 37 therefrom. The preform 30 is also cut along the vertical cutting line 41 to remove the first arm 34. Then, the front glass support board 45 is fitted about the lower end portion of the now shortened leg 13 with the bent upper end of the longer leg 46 received in the recess 39 and the dovetailed end 49 of the extension 48 of the shorter leg 47 received in the correspondingly shaped recess 38 to provide the central portion 31a of the front glass moulding. The preform sections forming the moulding side portions of the front glass moulding remain unprocessed to provide the side portions 31b of the front glass moulding. In the thus formed front glass moulding, the first grooves 35 in the side portions 31b defined by the top 32 and first arm 34 serve as the rainwater guides, whereas the first groove 35 in the central portion 31a is enlarged by the elimination of the first arm 34 and serves as the front glass pane receiving groove.

The second embodiment of the front glass moulding having the glass pane G supported therein is then placed in the glass panel P of the vehicular body with the outer side edge of the top 32 engaging the panel P to leave a clearance between the panel P and glass pane support board 45, and the clearance is partially filled with adhesive A to hold the front glass moulding in position in the vehicular body.

With the above-mentioned construction and arrangement of the components of the second embodiment of the front glass moulding, the integral front glass moulding can be easily produced from the single preform while having the side portions each having the rainwater guide and front glass pane receiving groove, and the central portion having the glass pane receiving groove, but not the rainwater guide. In addition, the glass pane can be received in the first groove of the central portion without the rainwater guide by the cooperation between the top of the body and the glass pane support board with the first arm removed from the central portion. Furthermore, as the front glass moulding does not require corner joints between the central and side portions as in the prior art front glass mouldings, the resulting front glass moulding presents a pleasing appearance and is rigid in construction. Still further, by the provision of the recesses in the opposite sides of the leg, the glass pane can be positively and simply held in the front glass moulding.

The advantages of the present invention, as well as certain changes and modifications of the disclosed embodiments thereof, will be readily apparent to those skilled in the art. It is the inventors' intention to cover by their claims all those changes and modifications which could be made to the embodiments of the invention herein chosen for the purpose of the disclosure without departing from the spirit and scope of the invention. Protection by Letters Patent of this invention in all its aspects as the same are set forth in the appended claims is sought to the broadest extent that the prior art allows.

What is claimed is:

1. A front glass moulding comprising an integrally formed synthetic resin body having a top and a leg extending downwardly from said top;
   said body having a central portion and two side portions each being connected at one end thereof to the respectively adjacent end of said central portion;
   said central portion including a front glass receiving groove positioned below said top;
   said side portions each including a rainwater guide positioned below said top and a front glass receiving groove positioned below said rainwater guide in spaced relation thereto;
   said front glass receiving grooves in the central and side portions cooperating with each other to support a front glass pane;
   each said two side portions having a first and second arm, said first arm extending outwardly from said leg below said top and in substantially parallel and spaced relation to said top, said first arm defining with said top and with said leg said rainwater guide, and said second arm extending outwardly from said leg and below said first arm, said second arm defining with said top, with said leg, and with said first arm said front glass receiving groove;
   said central portion having a front glass support board extending outwardly from said leg below said top and in substantially parallel and spaced relation to the top, said glass support board defining with said top and with said leg said front glass receiving groove; and
   wherein said glass support board has a dovetailed end received in a correspondingly shaped recess formed in said leg below said first arm.

2. A front glass moulding comprising an integrally formed synthetic resin body having a top and a leg extending downwardly from said top;
   said leg having a first and second recess therein;
   said body having a central portion and two side portions each being connected at one end thereof to the respectively adjacent end of said central portion;

said central portion including a front glass receiving groove positioned below said top;

said side portions each including a rainwater guide positioned below said top and a front glass receiving groove positioned below said rainwater guide in spaced relation thereto;

said front glass receiving grooves in the central and side portions cooperating with each other to support a front glass pane;

each said two side portions having a first and second arm, said first arm extending outwardly from said leg below said top and in substantially parallel and spaced relation to said top, said first arm defining with said top and with said leg said rainwater guide, and said second arm extending outwardly from said leg and below said first arm, said second arm defining with said top, with said leg, and with said first said front glass receiving groove;

said central portion having a substantially U-shaped glass pane support board fitted about the lower end of said leg of said body, said glass pane support board having a first leg and a second leg, said first leg of said support board being inwardly bent at an upper end portion thereof to be received in said first recess formed in said leg of said body, said second support board leg including a horizontal extension extending from the top of said second leg, said extension having a dovetailed inner end received in said second recess, said second recess being correspondingly dovetailed shaped, said substantially U-shaped glass pane support board defining with said top and with said leg of said body said glass receiving groove.

* * * * *